US010651491B2

(12) United States Patent
Hesampour et al.

(10) Patent No.: US 10,651,491 B2
(45) Date of Patent: May 12, 2020

(54) METHOD FOR REDUCING FOULING OF A MICROBIAL FUEL CELL, CLEANING AGENT COMPOSITION AND ITS USE

(71) Applicant: Kemira Oyj, Helsinki (FI)

(72) Inventors: Mehrdad Hesampour, Espoo (FI); Hannele Havansi, Espoo (FI); Pirjo Vainio, Nummela (FI); Kirsi Kilponen, Espoo (FI)

(73) Assignee: Kemira Oyj, Helsinki (FI)

( * ) Notice: Subject to any disclaimer, the term of this patent is extended or adjusted under 35 U.S.C. 154(b) by 161 days.

(21) Appl. No.: 15/755,076

(22) PCT Filed: Aug. 24, 2016

(86) PCT No.: PCT/FI2016/050579
§ 371 (c)(1),
(2) Date: Feb. 24, 2018

(87) PCT Pub. No.: WO2017/032924
PCT Pub. Date: Mar. 2, 2017

(65) Prior Publication Data
US 2018/0248214 A1 Aug. 30, 2018

(30) Foreign Application Priority Data

Aug. 24, 2015 (FI) .................................... 20155603

(51) Int. Cl.
| | | |
|---|---|---|
| *H01M 8/16* | (2006.01) | |
| *H01M 8/04* | (2016.01) | |
| *A01N 37/44* | (2006.01) | |
| *C11D 1/37* | (2006.01) | |
| *C11D 3/04* | (2006.01) | |
| *C11D 3/30* | (2006.01) | |
| *C11D 3/48* | (2006.01) | |
| *C02F 3/00* | (2006.01) | |
| *C02F 103/32* | (2006.01) | |
| *C11D 1/22* | (2006.01) | |

(52) U.S. Cl.
CPC .............. *H01M 8/16* (2013.01); *A01N 37/44* (2013.01); *C11D 1/37* (2013.01); *C11D 3/044* (2013.01); *C11D 3/30* (2013.01); *C11D 3/48* (2013.01); *H01M 8/04* (2013.01); *C02F 3/005* (2013.01); *C02F 2103/327* (2013.01); *C02F 2303/20* (2013.01); *C11D 1/22* (2013.01); *Y02E 60/527* (2013.01)

(58) Field of Classification Search
CPC ....................................................... H01M 8/16
See application file for complete search history.

(56) References Cited

U.S. PATENT DOCUMENTS

| | | | | |
|---|---|---|---|---|
| 6,887,597 B1 * | 5/2005 | Yang | ...................... | B08B 9/032 |
| | | | | 134/22.1 |
| 2006/0263646 A1 | 11/2006 | Seale | | |
| 2010/0279178 A1 | 11/2010 | Barkeloo et al. | | |
| 2011/0315561 A1 | 12/2011 | Rabaey et al. | | |
| 2012/0260938 A1 | 10/2012 | Zack et al. | | |

FOREIGN PATENT DOCUMENTS

| | | | | |
|---|---|---|---|---|
| CN | 101224391 A | * | 7/2008 | ............ B01D 61/10 |
| CN | 101224391 A | | 7/2008 | |
| EP | 0892040 A2 | | 1/1999 | |
| JP | 1046187 A | | 2/1998 | |
| JP | 2011-065821 | * | 3/2011 | ............ H01M 4/90 |
| JP | 2011065821 A | | 3/2011 | |
| JP | 2013145660 A | | 7/2013 | |
| RU | 2089603 C1 | | 9/1997 | |
| WO | 0027438 A1 | | 5/2000 | |
| WO | 2004035718 A2 | | 4/2004 | |
| WO | 2005103334 A1 | | 11/2005 | |
| WO | 2013009797 A1 | | 1/2013 | |
| WO | 2013160429 A1 | | 10/2013 | |

OTHER PUBLICATIONS

Machine translation of CN101224391 printed Sep. 2019 (Year: 2019).*
Machine Translation of JP 2011065821, printed Sep. 2019 (Year: 2019).*
Yong Yuan et al., Improved electricity production from sewage sludge under alkaline conditions in an insert-type air-cathode microbial fuel cell, Journal of Chemical Technology and Biotechnology, 2012: 87:80-86; whole document.
Xu J. et al. Fouling of proton exchange membrane (PEM) deteriorates the performance of microbial fuel cell. Water Research, Apr. 2012. vol. 46, No. 6, p. 1817-1824, whole document.
Choi M.-J. et al. Effects of biofouling on ion transport through cation exchange membranes and microbial fuel cell performance. Bioresource Technology, Jan. 2011. vol. 102, No. 1, p. 298-303, whole document.
Leong J. X. et al. Ion exchange membranes as separators in microbial fuel cells for bioenergy conversion: a commprehensive review. Renewable and sustainable energy reviews, 2013. vol. 28 p. 575-587, chapter 24. Biofouling.
Finnish Patent Office, Search Report of FI20155603, dated Mar. 31, 2016.

(Continued)

*Primary Examiner* — Maria Laios
(74) *Attorney, Agent, or Firm* — Berggren LLP

(57) ABSTRACT

The invention relates to a method for reducing fouling in a microbial fuel cell. The method comprises feeding of an influent comprising organic substance(s) into the microbial fuel cell (MFC), which comprises an anode and a cathode connected through an external electrical circuit with each other. Organic substance(s) are converted into electrical energy in the microbial fuel cell by using microorganisms, such as exoelectrogenic bacteria, and a treated flow is removed from the microbial fuel cell. A cleaning agent composition is fed simultaneously with the influent to the microbial fuel cell. The invention relates also to the cleaning agent composition and its use.

20 Claims, 3 Drawing Sheets

(56) References Cited

OTHER PUBLICATIONS

L. Rodriguez et al: "Influence of the cleaning additives on the methane production from brewery effluents", Chemical Engineering Journal, vol. 215-216, Nov. 22, 2012 (Nov. 22, 2012), pp. 685-690, XP55527510, ISSN: 1385-8947, DOI: 10.1016/j.cej.2012.10.090, the whole document.
Zhang et al: "Influence of cleaning frequency and membrane history on fouling in an anaerobic membrane bioreactor", Desalinat, Elsevier, Amsterdam, NL, vol. 207, No. 1-3, Mar. 19, 2007 (Mar. 19, 2007), pp. 153-166, XP005932807, ISSN: 0011-9164, DOI: 10.1016/J. DESAL. 2006.07.009, the whole document.
European Patent Office, Supplementary European Search Report for EP16838616 dated Nov. 29, 2018.

\* cited by examiner

METHOD FOR REDUCING FOULING OF A MICROBIAL FUEL CELL, CLEANING AGENT COMPOSITION AND ITS USE

PRIORITY

This application is a U.S. national application of PCT-application PCT/FI2016/050579 filed on Aug. 24, 2016 and claiming priority of Finnish application FI 20155603 filed on Aug. 24, 2015, the contents of all of which are incorporated herein by reference.

FIELD OF THE INVENTION

The present invention relates to a method for reducing fouling of a microbial fuel cell as well as to cleaning agent composition according to the preambles of the enclosed independent claims.

SUMMARY OF THE INVENTION

Microbial fuel cells (MFC) provide an alternative for energy generation. They provide a possibility to convert chemical energy into electrical energy by using microorganisms. A microbial fuel cell comprises a cell with an anode and a cathode, connected to each other through an external electrical circuit. On the anode side of cell organic substances in an aqueous liquid are oxidized by microorganisms. The oxidation generates carbon dioxide, electrons and protons. Microorganisms, such as exoelectrogenic bacteria, release some of the electrons produced from cell respiration to the anode. The electrons are transferred via the external circuit to the cathode, and the protons are transferred to the cathode through the liquid phase. Electrons and protons are consumed at the cathode, combining with oxygen, e.g. from air, and forming water according to the reaction:

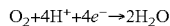

$$O_2 + 4H^+ + 4e^- \rightarrow 2H_2O$$

The performance of the microbial fuel cell may be influenced negatively by many factors. For example, microbial fuel cell reactors may be subjected to fouling and/or scale formation by organic and/or inorganic substances present in the influent. Fouling of cell components reduces the power production of the cell, because the fouling limits electron transfer to the anode, proton transfer to cathode or may cause poisoning of the cathode catalyst.

Furthermore, the bacterial composition and amount of bacteria in the microbial fuel cell reactor may change over time. For example, other bacterial species may start to compete with exoelectrogens. This may also result in decrease in power production and/or coulombic efficiency of the cell.

Typically the decrease in microbial fuel cell performance is gradual. At some point the performance is so poor that the cell operation must be discontinued, and the whole microbial fuel cell or at least some of its reactor components must be replaced with new ones, or the fuel cell must be disassembled for cleaning of the individual reactor components. Both alternatives are time consuming and/or expensive, and cause unnecessary down time for cell operation. Thus there exists a need for effective ways to clean microbial fuel cells.

DETAILED DESCRIPTION OF THE INVENTION

Figure 1:
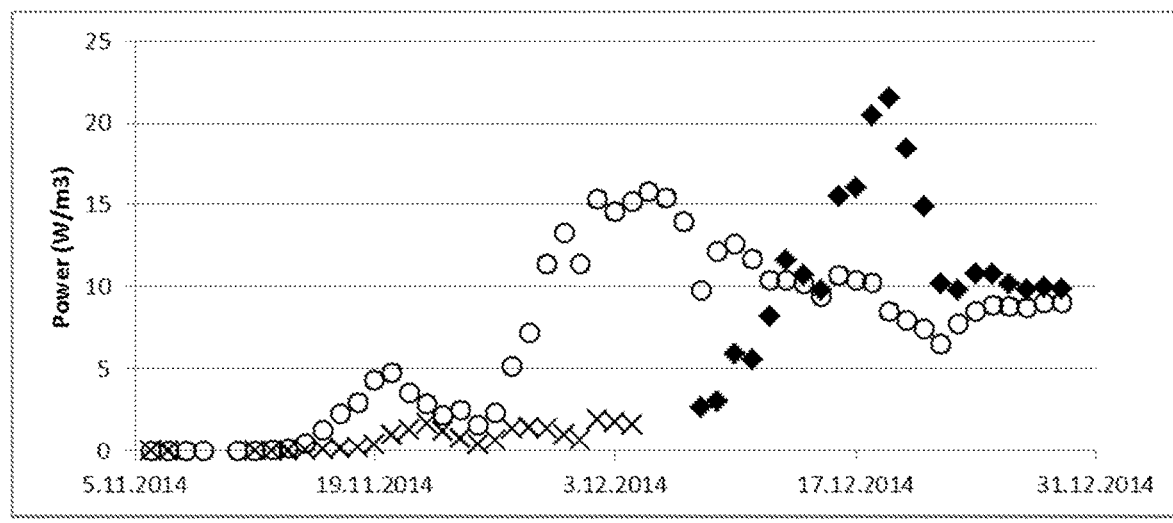
FIG. 1 Daily average of the power production of two similar microbial fuel cells FIG. 2 Daily average power production of microbial fuel cell FIG. 3 The coulomb efficiency of the microbial fuel cell before and after cleaning period FIG. 4 The daily average of power production of the microbial fuel cell using brewery wastewater FIG. 5 The daily average of power production of the microbial fuel cell FIG. 6 The coulomb efficiency of the microbial fuel cell FIG. 7 The daily average of power production during 3 different periods FIG. 8 The power production before and after the cleaning periods as the daily average of power production of the microbial fuel cell FIG. 9 The daily average of power production during six different periods

The object of the present invention is to minimize or even eliminate the disadvantages existing in the prior art.

One object of the present invention is to provide a method and a cleaning agent composition with which the power production of a microbial fuel cell can be maintained at acceptable level for prolonged times.

A further object of the present invention is to provide easy and simple way of reducing fouling of a microbial fuel cell.

All the described embodiments and advantages apply both for the method, the cleaning agent composition as well as to the use of the cleaning agent composition according to the present invention, when applicable, even if not always explicitly stated so.

These objects are achieved by the features disclosed in the independent claim and the invention is defined by the features of the enclosed independent claim.

Some preferred embodiments of the present invention are presented in the dependent claims.

Typical method according to the present invention for operating and reducing fouling of a microbial fuel cell comprises
- feeding an influent comprising organic substance(s) into the microbial fuel cell (MFC), which comprises an anode and a cathode connected through an external electrical circuit with each other,
- converting organic substance(s) into electrical energy in the microbial fuel cell by using microorganisms, such as exoelectrogenic bacteria,
- removing a treated flow from the microbial fuel cell, and
- feeding a cleaning agent composition to the microbial fuel cell. According to one preferable embodiment of the present invention the cleaning agent composition is fed simultaneously with the influent to the microbial fuel cell.

Typical cleaning agent composition according to the present invention for reducing fouling in a microbial fuel cell comprises
- 0.5-15 weight-%, preferably 2-10 weight-%, of at least one pH regulating agent,
- 0.5-40 weight-%, preferably 1-30 weight-%, of at least one chelating agent, and
- optionally 1-15 weight-%, preferably 2-10 weight-%, of at least one surfactant.

Typical use of the cleaning agent composition according to the present invention is for reducing fouling in a microbial fuel cell.

Now it has been found that the fouling of a microbial fuel cell can be reduced by feeding cleaning agent composition, preferably simultaneously with the influent, to the cell for obtaining an effective cleaning result. Cleaning agent composition interacts with the harmful substances, which allows their removal from the microbial fuel cell. For example, when the cleaning agent composition comprises chelating agent, the chelating agent is able to interact with scale forming ions, such as calcium ions, in the microbial fuel cell and transform them in a dissolved form, which can be removed from the microbial fuel cell with the treated flow, i.e. effluent. The present invention thus provides an effective way either to prevent the fouling of the microbial fuel cell or to reduce the existing fouling. The present invention provides the major practical advantage as the cleaning and/or reduction of fouling can be performed without disassembly of the microbial fuel cell, which makes the method easy and simple to operate and reduces costs and operational downtime.

The cleaning agent composition comprises a pH regulating agent and/or a chelating agent. Preferably the cleaning agent composition comprises at least one pH regulating agent and at least one chelating agent. The cleaning agent composition may further comprise an optional surfactant. The cleaning agent composition may comprise one or several pH regulating agents, one or several chelating agents and/or one or several optional surfactants.

In the present context the term "cleaning period" indicates the time period during which cleaning agent composition is fed to the microbial cell.

According to one embodiment of the invention a feed of the cleaning agent composition is fed to the microbial fuel cell intermittently under a cleaning period. The cleaning agent composition is allowed to interact with the detrimental inorganic, organic and/or biological substances in the cell under the cleaning period. The cleaning agent composition can be fed to the microbiological fuel cell as a one single dose or the cleaning agent composition may be fed as a constant input feed through the cell under the cleaning period.

According to another embodiment a feed of the cleaning agent composition is fed to the microbial fuel cell under a cleaning period, whereby the feeding of the influent is discontinued before start of the cleaning period. This means that the feeding of the influent is stopped before the start of the feeding of the cleaning agent composition. Thus the microbial fuel cell is non-operational under the cleaning period, when the cleaning agent composition is allowed to interact with the detrimental inorganic, organic and/or biological substances in the cell under the cleaning period. The cleaning agent composition can be fed to the microbiological fuel cell as a one single dose or the cleaning agent composition may be fed as a constant input feed through the cell under the cleaning period.

Under the cleaning period, the concentration of the cleaning agent composition in the feed to the microbial fuel cell may be in the range of 0.1-10 volume-%, preferably 0.5-7 volume-%, more preferably 0.5-5 volume-%. It has been noticed that this concentration of the cleaning agent composition provides optimal result in view of cleaning performance and overall process economy.

According to one embodiment of the invention the concentration of the cleaning agent composition is preferably such the pH in the microbial fuel cell remains below pH 13, preferably below pH 11, during the cleaning period. According to one preferable embodiment the concentration is such that the pH in the microbial fuel cell is in the range of 7-13, preferably 7.5-12, more preferably 8-10.5, during the cleaning period.

High alkaline pH, where pH value in the cell exceeds pH 11, such as pH 13, can preferably be used when the length of the cleaning period is short, such as under 1 h, preferably at maximum 30 min. This kind of high alkaline pH provides fast and effective reduction in existing fouling of the microbial fuel cell, and may effectively kill possible unbeneficial microorganisms. After cleaning by using high alkaline pH >11 the microbial fuel cell is preferably reinoculated as described below. Lower alkaline pH values, i.e. pH values <11, are preferred when the microbial fuel cell comprises sensitive materials, such as membranes, which may be damaged if contacted with high alkaline pH, or when a longer cleaning period, such as several hours, is used. Microorganisms may survive viable when lower alkaline pH is used during the cleaning period, whereby reinoculation is necessarily or typically not required.

According to one embodiment the microbial fuel cell is inoculated with microorganisms, and optionally with nutrients, after the end of the cleaning period. If the influent feed had been discontinued, the inoculation is preferably performed before the feeding of the influent is continued. The microorganisms may originate from effluents of one or several second microbial fuel cell(s). This provides a simple and effective way to inoculate the microbial fuel cell with microorganisms suitable for effective power production. The inoculation may be performed by feeding a single dose of effluent to the microbial fuel cell and recirculating the effluent through the fuel cell until sufficient power level in the cell is obtained. Alternatively the effluent can be fed from the second microbial fuel cell(s) as a continuous feed to the microbial fuel cell which is to be inoculated, whereby the effluent feed is continued until sufficient power level in the cell to be inoculated is obtained.

The microbial fuel cell can also be inoculated with new strain of microorganisms. This may be advantageous if the influent type or quality changes after the cleaning of the microbial fuel cell.

The microbial fuel cell is preferably flushed before inoculation. Flushing may be done by using water or effluent from the second microbial fuel cell(s). Flushing of the microbial fuel cell may provide several advantages. For example, the pH in the microbial fuel cell can adjusted with flushing to a level which is optimal for the function of the microorganisms with which the fuel cell will be inoculated. Flushing removes also possible remains of the detrimental substances, which have been inactivated (e.g. killed competing microorganisms) or released from the cell surfaces (e.g. scale forming ions) during the cleaning period.

According to the preferred embodiment of the present invention the cleaning agent composition is fed to the microbial fuel cell continuously or intermittently during a cleaning period under the operation of the microbial fuel cell. In other words, the cleaning agent composition is fed to the microbial fuel cell while the feed of the influent is continued in normal manner. Continuous addition of the cleaning agent composition to the influent of microbial fuel cell provides effective way of controlling and preventing fouling. When the cleaning agent composition comprises a chelating agent it interacts with scale forming cations, such as calcium, as well as other detrimental cations present in the influent and in the microbial fuel cell. The chelating agent prevents the cations to participate into scale or deposit formation on the surfaces of microbial fuel cell components. Continuous feeding makes it possible to have the microbial fuel cell operational at all times and eliminates, or at least reduces the need for cleaning periods when the operation of the microbial fuel cell must be discontinued.

According to one embodiment of the invention it is possible to feed cleaning agent composition together with the influent to the microbial fuel cell under a specified cleaning period, i.e. intermittently, while keeping the microbial fuel cell in operation. In this manner, the cleaning of the microbial fuel cell can be performed only when deemed necessary or beneficial, but without disadvantage of operation downtime.

In continuous or intermittent feeding of the cleaning agent composition simultaneously with the influent to the microbial fuel cell the concentration of the cleaning agent composition in the influent may be in the range of 0.01-0.5 volume-%. By using continuous or intermittent feeding of the cleaning agent composition simultaneously with the influent it is possible to use relatively low cleaning agent concentrations. This is beneficial for the microorganisms in the microbial fuel cell as they are not exposed for high concentrations of pH regulating agents and chelating agents, which might disturb their function.

According to one embodiment of the invention during continuous or intermittent feeding, simultaneously with the influent, the cleaning agent composition is fed in such amount that the pH in the microbial fuel cell remains below pH 11, preferably below pH 10.5. According to one preferable embodiment the concentration is such that the pH in the microbial fuel cell is in the range of 7-11, preferably 7.5-10.5, more preferably 8-10. Careful control of the pH ensures that the pH remains in the range where the microorganisms are able to thrive and operate.

According to one preferable embodiment of the invention the continuous or intermittent feeding of the cleaning agent composition, or a cleaning period with discontinued influent feed, is started when the power production of the microbial fuel cell is reduced. For example, the feeding of the cleaning agent composition can be started if the power production for a week is reduced with at least 10%, preferably 20%, more preferably at least 30%, compared to maximum weekly average of the preceding three weeks when the influent quality is in principle unchanged. When a reduction in power production is observed it is possible to discontinue the influent feed and start the feeding of the cleaning agent composition under a defined and restricted cleaning period, as described above. Alternatively, it is possible to start the feeding of the cleaning agent composition with or without a defined end in time while feeding the influent to the cell, i.e. to start a continuous or intermittent feed of the cleaning agent composition as described above.

The length of the cleaning period may be in the range of 5 min-24 h, preferably 0.5-24 h, more preferably 1-8 h. Length of the cleaning period may be selected depending on the process conditions, fouling degree of the microbial fuel cell, the microbial composition and amount of microorganisms within the microbial fuel cell after previous cleaning period, reactor type of the microbial fuel cell, materials of used cell components and/or the chemical composition of the cleaning agent composition. Preferably the length of the cleaning period is as short as possible, in order to minimise process downtime and the time under which the MFC components are subjected to the cleaning composition.

According to one embodiment of the invention the cleaning period is repeated less than once in 21 days, preferably less than once in 28 days, more preferably less than once in 60 days.

Typically the temperature of the feed of the cleaning agent composition to the microbial fuel cell is in the range of 15-40° C., preferably 20-35° C., more preferably 25-30° C.

The individual components of the cleaning agent composition, namely the pH regulating agent, chelating agent and/or the optional surfactant, can be mixed together before use, thus forming a premixed ready-to-use cleaning agent composition. Alternatively the individual components of the cleaning agent composition may be fed to the influent of the microbial fuel cell simultaneously but separately. Use of cleaning agent composition as premixed composition is preferred.

According to one embodiment of the invention the cleaning agent composition comprises 0.5-15 weight-%, preferably 2-10 weight-%, of at least one pH regulating agent; 0.5-40 weight-%, preferably 1-30 weight-%, of at least one chelating agent, and optionally 1-15 weight-%, preferably 2-10 weight-%, of at least one surfactant.

The pH regulating agent in the cleaning agent composition may be an alkaline agent or an acidic agent, preferably an alkaline agent. According to one embodiment of the invention the pH regulating agent is an alkaline agent, such as an alkaline hydroxide salt, whereby the pH of the cleaning agent composition is 7.5-14, preferably 8-13.5. Alkaline agent may be, for example, NaOH or KOH. According to another embodiment of the invention the pH regulating agent is an acidic agent, such as organic acid, whereby the pH of the cleaning agent composition is 3-6.5, preferably 3.5-5.5. Acidic agent may be, for example, peracetic acid.

According to on preferred embodiment of the invention the cleaning agent composition comprises at least one chelating agent. The chelating agent may be selected from a group comprising phosphate, phosphonate and polyaminopolycarboxylic acid; iminodisuccinic acid (IDS); ethylenediamine-N,N'-disuccinic acid (EDDS); methylglycinediacetic acid (MGDA); L-glutamic acid N,N-diacetic acid tetra sodium salt (GLDA); and aspartic acid diethoxysuccinate (AES).

According to one embodiment of the invention the chelating agent is polyaminopolycarboxylic acid which is selected from the group comprising ethylenediaminetetraacetic acid (EDTA); diethylenetriamine pentaacetic acid (DTPA); triethylenetetraminehexaacetic acid (TTNA); 1,3-diamino-2-hydroxypropane-N,N,N',N'-tetraacetic acid; propylenediamine tetraacetic acid; ethylenediamine tetraacetic acid; trans-1,2-diaminocyclohexane tetraacetic acid; ethylendiamine diacetic acid; ethylendiamine dipropionic acid; 1,6-hexamethylene-diamine-N,N,N',N'-tetraacetic acid; N,N-bis (2-hydroxybenzyl)ethylenediamine-N,N-diacetic acid; diaminopropane tetraacetic acid; iminodiacetic acid; 1,4,7, 10-tetraazacyclododecane tetraacetic acid; diaminopropanol tetraacetic acid and (hydroxyethyl) ethylenediaminetriacetic acid.

According to another preferable embodiment of the invention the chelating agent is phosphonate, which is selected from the group comprising hydroxyethylene diphosphonic acid (HEDP); diethylenetriamine pentamethylene phosphonic acid (DTPMPA); ethylenediamine tetra (methylene phosphonic acid) (EDTMP); and amino tris (methylenephosphonic acid) (ATMP).

According to still another preferable embodiment of the invention the chelating agent is selected from the group comprising iminodisuccinic acid (IDS); ethylenediamine-N, N'-disuccinic acid (EDDS); methylglycinediacetic acid (MGDA); L-glutamic acid N,N-diacetic acid tetra sodium salt (GLDA); and aspartic acid diethoxysuccinate (AES).

According to an embodiment of the invention the cleaning agent composition comprises at least one acid, such as organic acid. It is possible that the cleaning agent composition comprises only at least one acid or the cleaning agent composition may comprise at least one acid in any combination with other components of the cleaning agent composition, such as chelating agent and/or surfactant.

According to one preferable embodiment of the invention the cleaning agent composition comprises at least one alkaline agent, at least one chelating agent and optionally at least one surfactant. Even more preferably, the cleaning agent composition consists of at least one alkaline agent and at least one chelating agent. It has been observed that the cleaning agent composition comprising at least one alkaline agent and at least one chelating agent is especially suitable for embodiments where cleaning agent composition is continuously fed to the microbial fuel cell. An improvement in microbial fuel cell performance and power production has been observed.

The cleaning agent composition may optionally comprise at least one surfactant, which is selected from a group comprising anionic, cationic, amphoteric and non-ionic surfactants. Both natural and synthetic surfactants may be used. Anionic surfactant may be selected from ethoxylated amines; ethoxylated amides; sulfosuccinates; ethoxylated alcohol sulfates; alkyl ether phosphonates; alkyl ether carboxylic acids and their salts; alkyl ether sulphates; alkyl phosphates; fatty alcohol sulphates and anionic polymeric surfactants. Non-ionic surfactant may be selected from alkanolamides; amine oxides; ethoxylated primary and secondary alcohols; ethoxylated alkylphenols; ethoxylated fatty esters; glycerol esters; amine and amide derivatives, and non-ionic polymeric surfactants, such as non-ionic block polymers. Amphoteric surfactants may be selected from amido betaines and alkyl betaines. Cationic surfactants may be selected from C12-C18 amines; diamines; polyamines; quaternary amines; poly oxyethylenated amines; quaternized amines and amine oxides.

According to one embodiment of the present invention the influent, which comprises organic substance and which can be treated in the present method, is preferably an effluent from pulp and paper industry process, oil and gas industry process, or mining process.

The influent to be treated may also originate from food or beverage industry, for example from brewery or dairy.

According to another embodiment of the invention the influent to be treated is municipal or agricultural effluent. According to one preferred embodiment the influent to be treated is municipal effluent, which comprises municipal sludge mixed with wastewater.

The organic substances in the influent are converted into electrical energy by microorganisms, such as exoelectrogenic bacteria.

The present method is suitable for microbial fuel cells, which comprise a reactor cell with at least one anode and at least one cathode, optionally separated by a membrane, for example a cation-selective membrane. The anode and cathode are connected to each other through an external electrical circuit and through the liquid phase present in the cell. On the anode side of the cell organic substances in the aqueous liquid phase are oxidized by microorganisms. The oxidation generates carbon dioxide, electrons and protons. The electrons are transferred via the anode and the external circuit to the cathode, and the protons are transferred to the cathode through the liquid phase, and the optional membrane. The electrons and protons react with oxygen at the cathode, optionally enhanced by a catalyst, to form water.

The anode and cathode of the microbial fuel cell can be prepared by using a mixture of one or more electrically conductive materials, such as metals, carbon or polymers. They may also contain other materials, for example ion exchange materials. For example, the anode may be formed as brush, plate, granules, fibrous material, etc. According to one preferred embodiment the cathode is an air-cathode.

The microbial fuel cell may also comprise a separator arranged between the anode and cathode. The separator allows close spacing of the anode and cathode while preventing short-circuit. The separator may also serve additional purposes, for example it can protect the cathode from fouling and limit oxygen diffusion to the anode side. The separator may also be a membrane, for example a cation selective membrane. Preferably the separator comprises at least one electrically insulating layer.

EXPERIMENTAL

Some embodiments of the invention are described in the following non-limiting examples.

General

Cleaning of microbial fuel cells was performed at 30° C. temperature. In Examples 1-4 and in Example 6 1000 ml of cleaning agent composition was circulated at 30 ml per minute under the cleaning period of ca. 24 hours and the microbial fuel cell was flushed with tap water with the same circulation speed for one hour.

Anode chamber volume was 25 ml in all examples. All power production ($W/m^3$) results are expressed in relation to this reactor volume. Active electrode areas were 50 $cm^2$. An external resistor was connected between anode and cathode electrodes. Anode potential against cathode potential was measured at 10 minute intervals. The cell voltage and external resistor value were used to calculate power and current. If desired, analysis of soluble COD was performed three times a week for the effluents and once a week for the influents.

Inoculation of the reactors was performed in the same manner in all the examples, in the beginning and after cleaning of the microbial fuel cell reactor. Inoculation was done by using a prepared mixture of fresh MFC effluents and substrate, which was recirculated through the reactor during the inoculation period.

Example 1

The reactor of the microbial fuel cell comprised an anode electrode, which was a carbon cloth, a separator which was a polyamide membrane and a cathode electrode which was a carbon cloth with catalyst. Two similar reactors were inoculated at the same time. The reactors were fed with dairy wastewater after the inoculation.

The microbial fuel cell showed poor performance after few weeks of operation. The cleaning was done from anode side, and a cleaning feed of cleaning agent composition, used in amount 5 volume-%, calculated from total feed volume, was introduced into anode chamber of the microbial fuel cell for the cleaning period. Cleaning agent composition comprised 5.5% of EDTA, 8.5% of NaOH, 3.5% of sodium dodecylbenzenesulfonate, and 1.5% of sodium cumenesulfonate. After the cleaning period the microbial fuel cell was flushed with water for an hour and inoculated again. Comparison of power production before and after cleaning period showed significant improvement in performance after cleaning period.

FIG. 1 shows the daily average of power production of the two similar microbial fuel cells, expressed in W/m$^3$, when dairy wastewater was used as influent. The operation time before cleaning is shown with crosses. The operation time after cleaning period and re-inoculation is highlighted with black squares. The power production of the microbial fuel cell reference reactor for the same time period is shown with circles. It can be seen from FIG. 1 that the daily average of the power production for the microbial fuel cell before cleaning period was less than 2 W/m$^3$. After cleaning period the power production of the microbial fuel cell continuously increased and reached to a maximum of 22 W/m$^3$ and then stabilized to the level of its reference pair.

The impact of the cleaning period can be also seen from maximum power point (MPP) data, which is shown in Table 1. MPP data was obtained from linear sweep voltammetry (LSV) scans using two electrodes and a potentiostat. The MPP values increased significantly after cleaning period and reinoculation, see values on 18.12. The MPP value dropped in the next scan, performed on 30.12, but was still above the value before cleaning, see value on 27.11, and on the same level as the reference pair on 18.12.

TABLE 1

Maximum power point, MPP (W/m$^3$) values for cleaned MFC and for the reference pair MFC (non-cleaned).

| | Date | | | | | |
|---|---|---|---|---|---|---|
| | 20.11. | 27.11. | 4.12. | 11.12. | 18.12. | 30.12. |
| MPP for Cleaned MFC (W/m$^3$) | 2 | 2 | | | 36 | 13 |
| MPP for Reference MFC (W/m$^3$) | 6 | 8 | 21 | 17 | 13 | |

Example 2

The reactor of the microbial fuel cell comprised an anode electrode made of 5 layers of stainless steel mesh, a separator, which was a polyamide membrane and a cathode electrode, which was a carbon cloth with catalyst. The microbial fuel cell reactor was run with brewery wastewater after inoculation.

The cleaning was done from anode side, and a feed of cleaning agent composition, used in amount 5 volume-%, calculated from total feed volume, was introduced into anode chamber of the microbial fuel cell for the cleaning period. Cleaning agent composition comprised 5.5% of EDTA, 8.5% of NaOH, 3.5% of sodium dodecylbenzenesulfonate, and 1.5% of sodium cumenesulfonate. After the cleaning period the microbial fuel cell was flushed with water for an hour and inoculated again.

Figure 2:
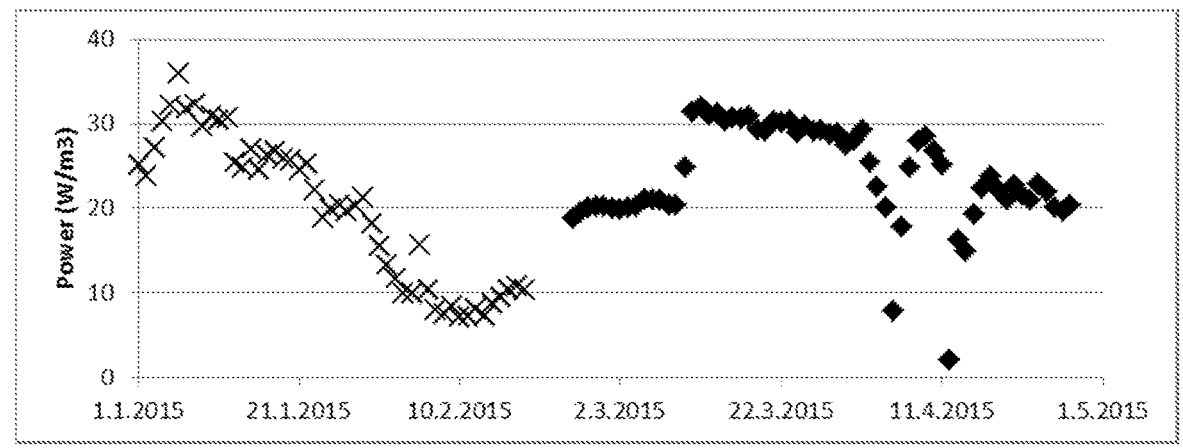

FIG. 2 shows the daily average of power production of the microbial fuel cell. The operation time before cleaning is shown with crosses. The operation time after cleaning period and re-inoculation is shown with black squares. It can be seen that power production showed significant improvement in performance after the cleaning period.

The coulombic efficiency (CE %) is calculated using the ratio of total coulombs obtained, $C_{out}$ to the theoretical amount, $C_{in}$, available from complete influent oxidation:

$$CE\% = C_{out}/C_{in} \times 100\% = (I \times t)/((F \times n \times \Delta COD \times V)/M)$$

where
I is the daily average current (A), calculated from cell voltage and resistor value;
t is the time interval;
M is the molecular weight of oxygen;
F is the Faraday constant;
n is the number of electrons exchanged per mole of oxygen;
$\Delta COD$ is the removal amount in soluble COD;
V is the volume of reactor anode chamber.

Figure 3:
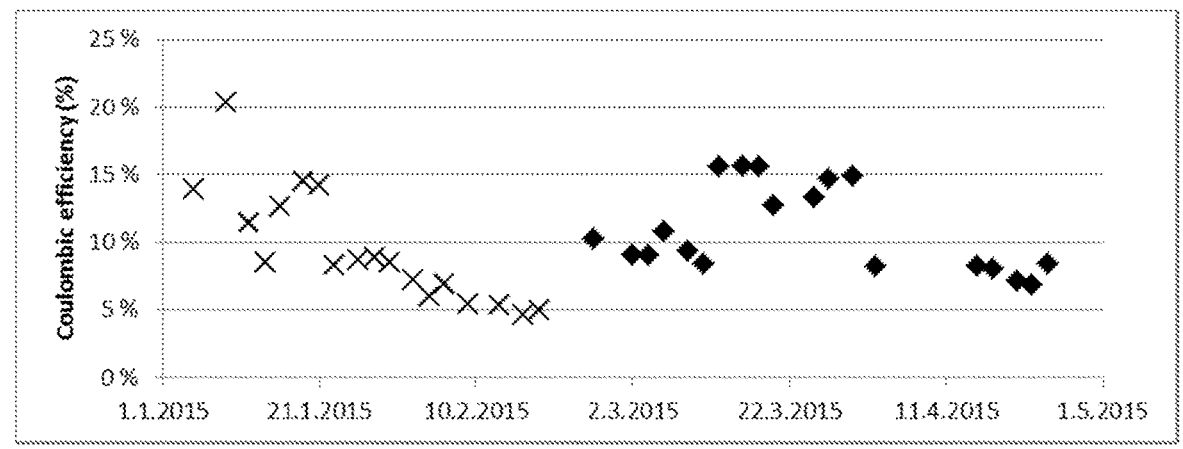

Coulombic efficiency of the microbial fuel cell had decreased to ca. 6% prior the cleaning period. Coulombic efficiency increased after the cleaning period as the power production increased and COD removal decreased. FIG. 3 shows the coulombic efficiency of the microbial fuel cell before and after cleaning period. The operation time before cleaning is shown with crosses. The operation time after cleaning period and re-inoculation is shown with black squares. It can be observed that cleaning improved the coulombic efficiency for ca. 2 months.

Example 3

The reactor of the microbial fuel cell comprised an anode electrode, which was a carbon cloth, a separator, which was tissue and a cathode electrode, which was a carbon cloth with catalyst. The microbial fuel cell was membraneless and therefore proton and water transferred between anode and cathode without limitation.

The microbial fuel cell was run initially with dairy wastewater. Influent was changed to brewery wastewater, date 30.12. The cleaning was done from anode side, and a cleaning feed of cleaning agent composition, used in amount 2.5 volume-%, calculated from total feed volume, was introduced into anode side of the microbial fuel cell for the cleaning period. Cleaning agent composition comprised 5.5% of EDTA, 8.5% of NaOH, 3.5% of sodium dodecylbenzenesulfonate, and 1.5% of sodium cumenesulfonate. After the cleaning period the microbial fuel cell was flushed with water for an hour and inoculated again.

Figure 4:
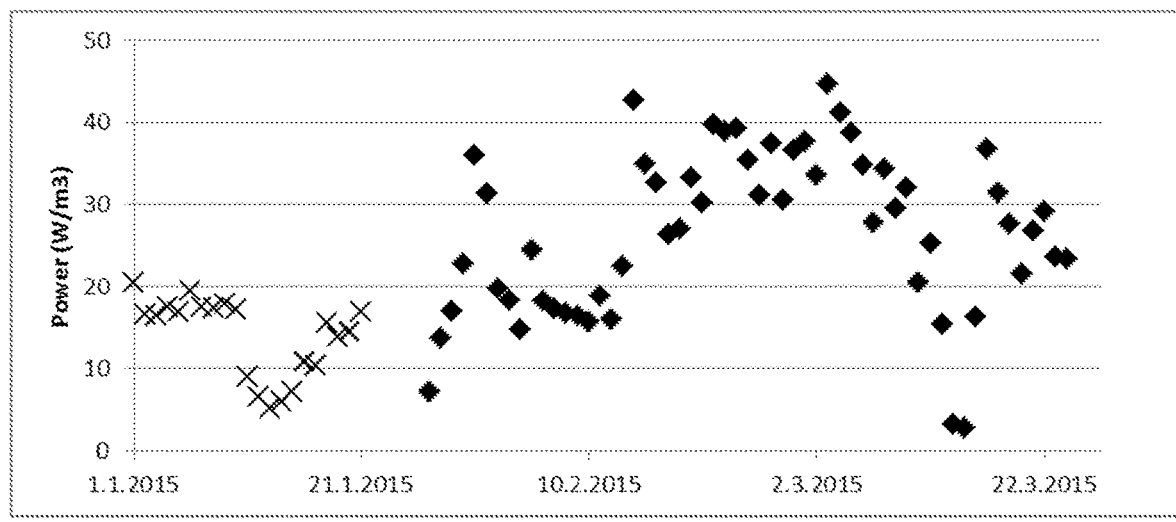

FIG. 4 shows the daily average of power production of the microbial fuel cell using brewery wastewater. The operation time before cleaning is shown with crosses. The operation time after cleaning period and re-inoculation is shown with black squares. It can be seen that power production showed significant improvement in performance after the cleaning period.

Example 4

The microbial fuel cell in Example 4 was identical to microbial fuel cell of Example 3. The microbial fuel cell was run with brewery wastewater. Cleaning was performed in similar manner than in Example 3.

Figure 5:
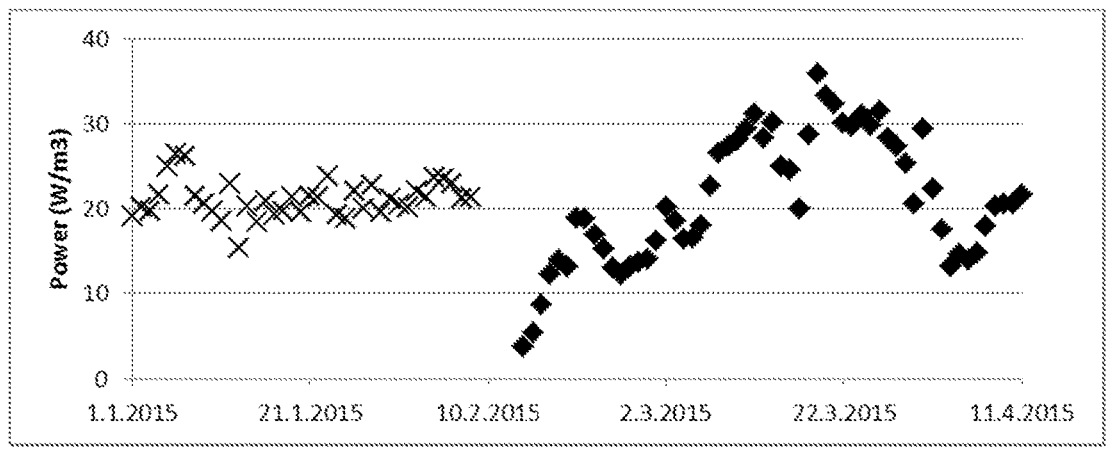

FIG. 5 shows the daily average of power production of the microbial fuel cell. The operation time before cleaning is shown with crosses. The operation time after cleaning period and re-inoculation is shown with black squares. Power production showed slight improvement after the cleaning period.

Figure 6:
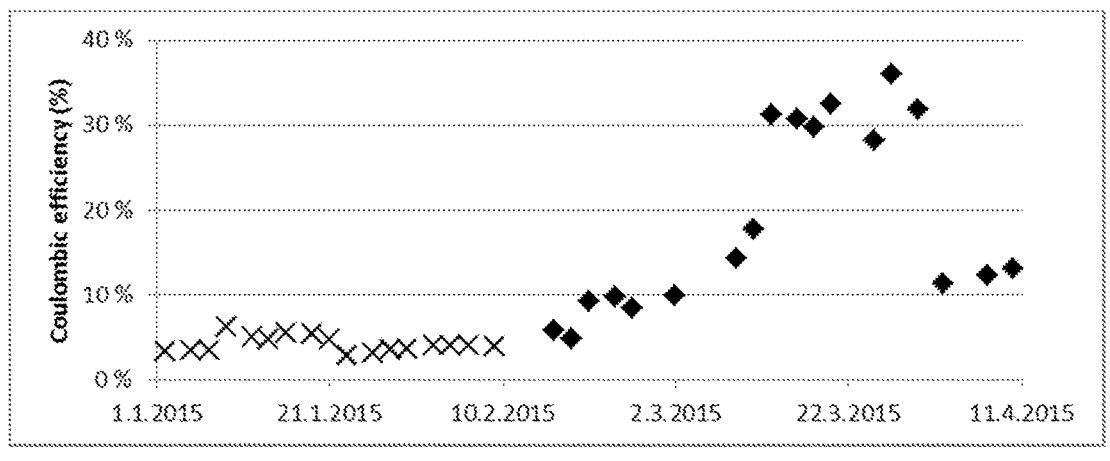

Coulombic efficiency of the microbial fuel cell was calculated in same manner as described above. The coulombic efficiency increased significantly after the cleaning period as power production increased slightly and COD removal decreased significantly. FIG. 6 shows the coulombic efficiency. The operation time before cleaning is shown with crosses. The operation time after cleaning period and re-inoculation is shown with black squares.

Example 5

The same microbial fuel cell reactor as in Example 1 was later fed with cleaning agent composition in two different concentrations. Cleaning agent composition comprised 5.5% of EDTA, 8.5% of NaOH, 3.5% of sodium dodecylbenzenesulfonate, and 1.5% of sodium cumenesulfonate. At this time the microbial fuel cell was fed with brewery wastewater in batches, the batch was changed 2-3 times a week.

Cleaning agent composition was fed at 30° C. temperature with continuous flow speed of 2 ml/h through the microbial fuel cell reactor.

Figure 7:
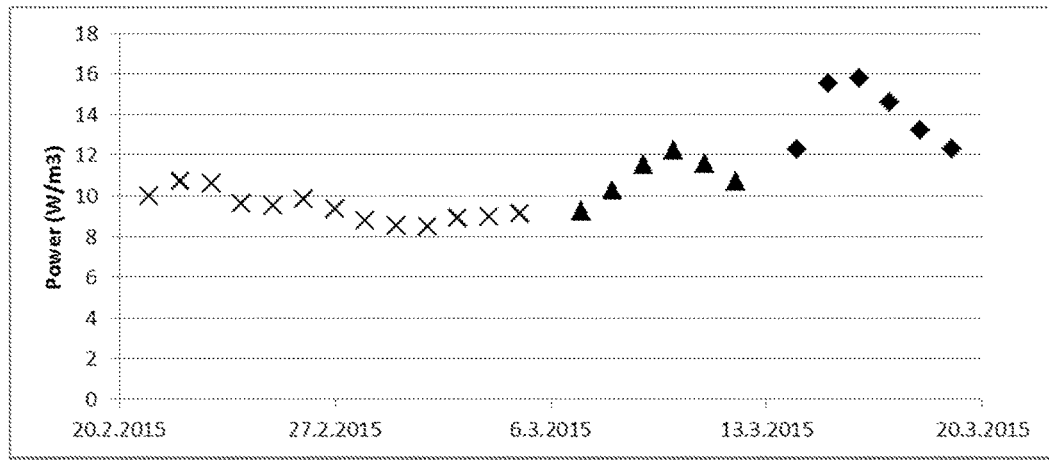

FIG. 7 shows the daily average of power production during 3 different periods:
1) first period, indicated with crosses, comprised brewery wastewater with pH adjusted initially in the range of 10.2-10.7 with NaOH;
2) second period, indicated with black triangles, comprised cleaning agent composition fed into brewery wastewater in concentration of 0.2 volume-%, calculated from the total influent volume;
3) third period, indicated with black squares, comprised cleaning agent composition fed into brewery wastewater in concentration of 0.4 volume-%, calculated from the total influent volume.

Power level in FIG. 7 was increasing with increasing concentration of cleaning agent in influent.

Example 6

The reactor of the microbial fuel cell comprised an anode electrode made of 5 layers of stainless steel mesh, a separator, which was a polyamide membrane and a cathode electrode, which was a carbon cloth with catalyst. The microbial fuel cell reactor was run with brewery wastewater after inoculation. The microbial fuel cell was cleaned twice.

Cleaning agent composition comprised an organic acid, namely peracetic acid. The cleaning was done from anode side, and a cleaning feed (pH 1) of cleaning agent composition, used in amount 1 volume-%, calculated from total feed volume, was introduced into anode side of the microbial fuel cell for a cleaning period of two hours. After the cleaning period the microbial fuel cell was flushed with water for an hour and inoculated again.

The microbial fuel cell was cleaned again 27 days later. The cleaning was done from anode side, and a cleaning feed of formulated cleaning agent composition used in amount 5 volume-%, calculated from total feed volume, was introduced into anode chamber of the microbial fuel cell for the cleaning period. Cleaning agent composition comprised 5.5% of EDTA, 8.5% of NaOH, 3.5% of sodium dodecylbenzenesulfonate, and 1.5% of sodium cumenesulfonate. After the cleaning period the microbial fuel cell was flushed with water for an hour and inoculated again.

Figure 8:
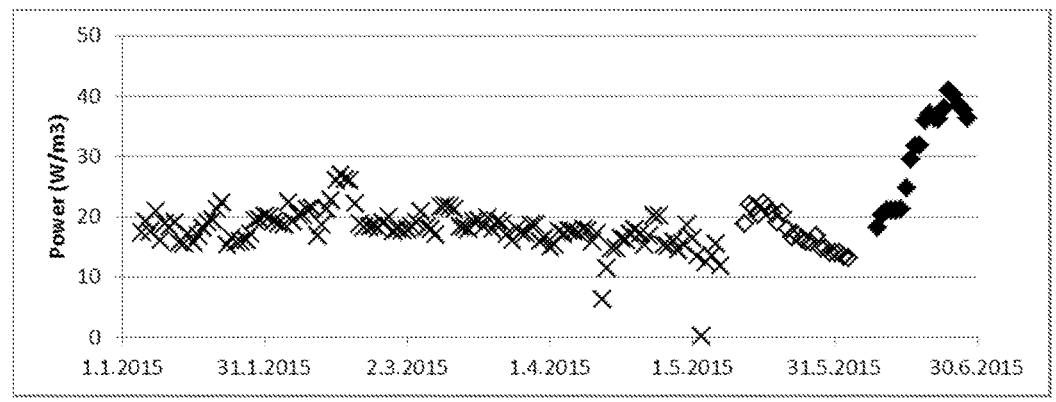

FIG. 8 shows the power production before and after the cleaning periods as the daily average of power production of the microbial fuel cell. The operation time before cleanings is shown with crosses. The operation time after biocide cleaning and re-inoculation is shown with squares. The operation time after cleaning with formulated solution and re-inoculation is shown with black squares. Power production showed initially slight improvement after the acidic cleaning, but soon decreased back to earlier level. However, after cleaning with formulated cleaning agent composition the microbial fuel cell reached a significantly higher power level than before.

Example 7

The reactor of the microbial fuel cell comprised an anode electrode, which was a carbon cloth, a separator which was a polyamide membrane and a cathode electrode which was a carbon cloth with catalyst. The reactor was run with brewery wastewater after inoculation.

The reactor was fed with cleaning agent composition containing chelating agents and pH regulating agent. At this time the microbial fuel cell was fed with brewery wastewater in batches, the batch was changed 2-3 times a week.

Cleaning agent composition was fed at 30° C. temperature with continuous flow speed of 2-3 ml/h through the microbial fuel cell reactor.

Figure 9:
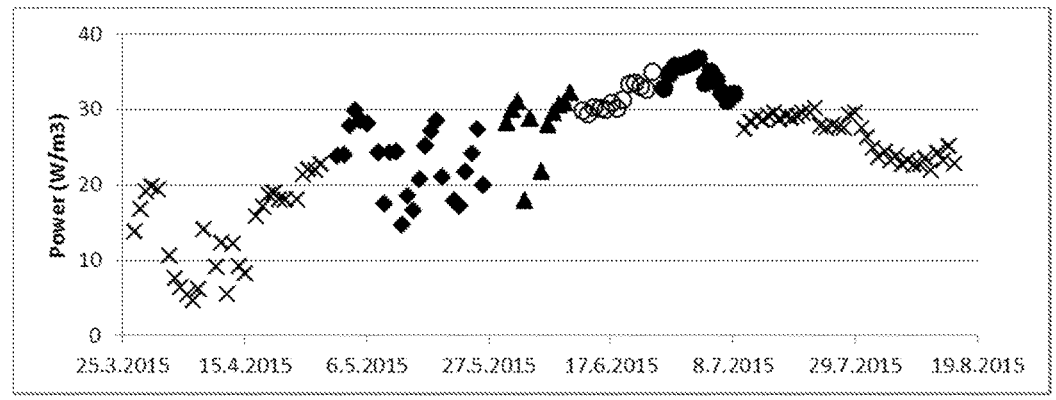

FIG. 9 shows the daily average of power production during six different periods:
1) first period, indicated with crosses, comprised continuous feed of brewery wastewater;
2) second period, indicated with black squares, comprised chelating agent 1, ethylene dianinetetraacetic acid 0.05 molar, fed into brewery wastewater in concentration of 0.16 volume-%, calculated from the total influent volume, with pH adjusted initially to 10.2 with NaOH;
3) third period, indicated with black triangles, comprised chelating agent 2, iminodisuccinic acid 34 weight-%, fed into brewery wastewater in concentration of 0.03 volume-%, calculated from the total influent volume, with pH adjusted initially to 10.3 with NaOH;
4) fourth period, indicated with empty circles, comprised brewery wastewater with pH adjusted initially to 10.3 with NaOH;
5) fifth period, indicated with filled circles, comprised chelating agent 3, aspartic acid diethoxysuccinate 39 weight-%, fed into brewery wastewater in concentration of 0.03 volume-%, calculated from the total influent volume, with pH adjusted initially to 10.3 with NaOH;
6) sixth period, indicated with crosses, comprised continuous feed of brewery wastewater.

It can be observed from FIG. 9 how the continuous feeding of cleaning agent improved the power production level during periods 2 and 3. Intermittent cleaning was tested by stopping the feeding of cleaning agent composition for periods 4 and 6. Power production remained consistently at a higher level compared to period 1 during period 4 and for over two weeks during period 6. Highest power level was achieved during period 5.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method for reducing fouling in a microbial fuel cell, the method comprising:
   feeding an influent comprising organic substance(s) together and simultaneously with a cleaning agent composition into the microbial fuel cell (MFC), comprising an anode and a cathode connected through an external electrical circuit with each other;
   converting organic substance(s) into electrical energy in the microbial fuel cell by using microorganisms; and removing a treated flow from the microbial fuel cell,
wherein the cleaning agent composition interacts with harmful substances allowing their removal from the microbial fuel cell with the treated flow.

2. The method according to claim 1, wherein a feed of the cleaning agent composition is fed to the microbial fuel cell under a cleaning period.

3. The method according to claim 2, wherein the concentration of the cleaning agent in the feed is in a range of 0.1-10 volume-%.

4. The method according to claim 2, wherein the concentration of the cleaning agent in the feed is in a range of 0.5-7 volume-%.

5. The method according to claim 2, wherein the concentration of the cleaning agent in the feed is in a range of 0.5-5 volume-%.

6. The method according to claim 1, wherein the cleaning agent composition is fed to the microbial fuel cell continuously under the operation of the microbial fuel cell.

7. The method according to claim 1, wherein the cleaning agent composition is fed simultaneously with the influent to the microbial fuel cell, whereby the concentration of the cleaning agent composition in the influent is in a range of 0.01-0.5 volume-%.

8. The method according to claim 1, wherein the length of the cleaning period is in a range of 5 min-24 h.

9. The method according to claim 1, wherein the cleaning agent composition is fed in such amount that the pH in the microbial fuel cell remains below pH 11.

10. The method according to claim 1, wherein the feed of the cleaning agent composition is started when the power production of the microbial fuel cell is reduced.

11. The method according to claim 1, wherein the influent comprising organic substance originates from food or beverage industry, pulp and paper industry process, oil and gas industry process, mining process, or from municipal or agricultural water treatment process.

12. The method according to claim 1, wherein the cleaning agent composition comprises:
    0.5-15 weight-% of at least one pH regulating agent;
    0.5-40 weight-% of at least one chelating agent; and
    optionally 1-15 weight-% of at least one surfactant.

13. The method according to claim 12, wherein the at least one pH regulating agent is an alkaline agent, whereby the pH of the cleaning agent composition is 7.5-14.

14. The method according to claim 12, wherein the at least one pH regulating agent is an acidic agent, whereby the pH of the cleaning agent composition is 3-6.5.

15. The method according to claim 12, wherein the at least one chelating agent is selected from a group comprising phosphate, phosphonate and polyaminopolycarboxylic acid; iminodisuccinic acid (IDS); ethylenediamine-N,N'-disuccinic acid (EDDS); methylglycinediacetic acid (MGDA); L-glutamic acid N,N-diacetic acid tetra sodium salt (GLDA); and aspartic acid diethoxysuccinate (AES).

16. The method according to claim 12, wherein the at least one surfactant is:
    any one of following anionic surfactants selected from ethoxylated amines; ethoxylated amides; sulfosuccinates; ethoxylated alcohol sulfates; alkyl ether phosphonates; alkyl ether carboxylic acids and their salts; alkyl ether sulphates; alkyl phosphates; fatty alcohol sulphates and anionic polymeric surfactants;
    any one of following non-ionic surfactants selected from alkanolamides; amine oxides; ethoxylated primary and secondary alcohols; ethoxylated alkylphenols; ethoxylated fatty esters; glycerol esters; amine and amide derivatives, and non-ionic polymeric surfactants, being non-ionic block polymers;
    any one of following amphoteric surfactants selected from amido betaines and alkyl betaines; and
    any one of following cationic surfactants selected from C12-C18 amines; diamines; polyamines; quaternary amines; poly oxyethylenated amines;
    quaternized amines and amine oxides.

17. The method according to claim 12, wherein the at least one pH regulating agent is an alkaline agent, whereby the pH of the cleaning agent composition is 8-13.5.

18. The method according to claim 12, wherein the at least one pH regulating agent is an acidic agent, whereby the pH of the cleaning agent composition is 3.5-5.5.

19. The method according to claim 1, wherein the length of the cleaning period is in a range of 1-8h.

20. The method according to claim 1, wherein the cleaning agent composition is fed in such amount that the pH in the microbial fuel cell remains below pH 10.5.

* * * * *